US012118165B2

(12) United States Patent
Ichikawa et al.

(10) Patent No.: US 12,118,165 B2
(45) Date of Patent: Oct. 15, 2024

(54) PROXIMITY DETECTION DEVICE AND METHOD FOR DETECTING PROXIMITY

(71) Applicant: Alps Alpine Co., Ltd., Tokyo (JP)

(72) Inventors: Teiichi Ichikawa, Fukushima (JP); Shohei Yoshida, Fukushima (JP)

(73) Assignee: ALPS ALPINE CO., LTD., Tokyo (JP)

( * ) Notice: Subject to any disclaimer, the term of this patent is extended or adjusted under 35 U.S.C. 154(b) by 0 days.

(21) Appl. No.: 18/466,161

(22) Filed: Sep. 13, 2023

(65) Prior Publication Data

US 2024/0126393 A1   Apr. 18, 2024

(30) Foreign Application Priority Data

Sep. 22, 2022  (JP) .................................. 2022-150903

(51) Int. Cl.
   *G06F 3/042*   (2006.01)
(52) U.S. Cl.
   CPC .. *G06F 3/0421* (2013.01); *G06F 2203/04108* (2013.01)
(58) Field of Classification Search
   CPC .................................................... G06F 3/0421
   See application file for complete search history.

(56) References Cited

U.S. PATENT DOCUMENTS

| 2016/0334883 A1* | 11/2016 | Kim ....................... B60K 35/00 |
| 2021/0195050 A1 | 6/2021 | Ichikawa |
| 2022/0011877 A1 | 1/2022 | Ichikawa |

FOREIGN PATENT DOCUMENTS

JP   2019-074465 A   5/2019

OTHER PUBLICATIONS

Extended European Search Report from EP 23197617.6, 1-12 pp., Feb. 2, 2024.

* cited by examiner

Primary Examiner — Gustavo Polo
(74) Attorney, Agent, or Firm — Crowell & Moring LLP

(57) ABSTRACT

A proximity detection device according to the present invention includes: a plurality of light emitting elements; a plurality of light receiving elements; a drive circuit configured to sequentially drive the plurality of light emitting elements; a measurement circuit configured to measure a light reception signal of a corresponding light receiving element when the plurality of light emitting elements are sequentially driven; and a control unit configured to i) control a drive current of a light emitting element such that a light emission amount of the light emitting element is suppressed, and ii) amplify a detection signal of a light receiving element to compensate for the suppressed light emission amount during measurement with a relatively short distance between the light emitting element and the light receiving element.

18 Claims, 9 Drawing Sheets

PROXIMITY DETECTION DEVICE AND METHOD FOR DETECTING PROXIMITY

RELATED APPLICATION

The present application claims priority to Japanese Patent Application No. 2022-150903, filed Sep. 22, 2022, the entirety of which is hereby incorporated by reference.

BACKGROUND

1. Field

The present disclosure relates to a proximity detection device that detects whether or not there is an object that is in proximity thereto, and particularly, to a proximity detection device installed in an electronic device, such as a touch panel display.

2. Description of the Related Art

In recent years, practical application of input using a touch panel display, a gesture input, or the like has resulted in an increase in mounting of proximity detection devices on in-vehicle displays. A proximity detection device detects proximity of an object, for example, using infrared LEDs emitting infrared light, and light receiving elements such as photodiodes, by irradiating the object with the infrared light and receiving reflected light thereof (see e.g., JP 2019-74465 A).

SUMMARY

FIGS. 1A and 1B illustrate an example of mounting of a proximity detection device on an in-vehicle display. A touch panel display 1 is arranged in a center console 2 in a middle portion between a driver's seat and a front passenger's seat, and the proximity detection device for detecting a gesture operation or the like of a driver or a passenger is mounted on the display 1. As illustrated in FIG. 1B, the proximity detection device includes a proximity detection unit at a lower portion of the display 1, and the proximity detection unit includes four light emitting elements LED1, LED2, LED3, and LED4 and two light receiving elements PD1 and PD2 (collectively referred to as light emitting elements LED and light receiving elements PD). The light emitting elements LED and the light receiving elements PD are arranged in a substantially linear shape in the lower portion of the display 1, with the light receiving element PD1 being arranged between the light emitting elements LED1 and LED2 and the light receiving element PD2 being arranged between the light emitting elements LED3 and LED4. The light emitting elements LED are light emitting diodes emitting infrared rays, and the light receiving elements PD are photodiodes or phototransistors receiving reflected light of the infrared rays.

The light emitting element LED irradiates a front surface of the display 1 with infrared light. When an operation target (such as a hand or a finger) 4 of a user approaches the front surface of the display 1, irradiation light 5 from the light emitting element LED is reflected from the operation target 4, and the light receiving element PD receives the reflected light, thereby detecting the proximity of the operation target 4.

FIG. 2 illustrates operation timings of the light emitting elements LED and the light receiving elements PD. The light emitting elements LED1, LED2, LED3, and LED4 are sequentially driven at timings t1, t2, t3, and t4 so that respective light emissions thereof do not overlap each other. The light receiving element PD1 is controlled to receive light at timings synchronized with light emission periods of the light emitting element LED1 and the light emitting element LED2, and the light receiving element PD2 is controlled to receive light at timings synchronized with light emission periods of the light emitting element LED3 and the light emitting element LED4. That is, light reflected when the light emitting element LED1 emits light is measured by the light receiving element PD1 (LED1→PD1), light reflected when the light emitting element LED2 emits light is measured by the light receiving element PD1 (LED2→PD1), light reflected when the light emitting element LED3 emits light is measured by the light receiving element PD2 (LED3→PD2), and light reflected when the light emitting element LED4 emits light is measured by the light receiving element PD2 (LED4→PD2). These four measurements are operated as one cycle.

Operation in Front of Screen in Case where Light Emitting Elements and Light Receiving Elements are Arranged at Substantially Equal Intervals Detection levels of the light receiving elements PD1 and PD2 in one cycle when the target 4 is moved horizontally are substantially equal as illustrated in FIG. 3. In the display having such a proximity detection function, a horizontal position of the operation target 4 can be estimated on the basis of a distribution of reflected light detected when the individual light emitting elements LED emit light.

FIG. 4A illustrates the operation target 4 positioned at P1 and at P2, FIG. 4B illustrates detection levels of the light receiving elements PD when the operation target 4 approaches the position P1 on a left side of the screen, FIG. 4C illustrates detection levels of the light receiving elements PD when the operation target 4 approaches the position P2 on a right side of the screen, and FIG. 4D illustrates estimated positions G of the operation target 4 in a horizontal direction.

The position P1 is in the vicinity of the light emitting element LED1. Hence, the light receiving element PD1 has the highest detection level when the light emitting element LED1 emits light and has a gradual decrease in detection level when the light emitting elements LED2, LED3, and LED4 emit light. In addition, the position P2 is in the vicinity of the light emitting element LED4. Hence, the highest detection level is observed when the light emitting element LED4 emits light, and the detection levels gradually decrease when the light emitting elements LED3, LED2, and LED1 emit light.

As a means for quantifying the horizontal position of a detection object from a distribution of the detection levels, a centroid calculation method is generally effective. This calculation method will be described. For example, when coordinates of horizontal positions detected by the light emitting elements LED1, LED2, LED3, and LED4 are set as x1, x2, x3, and x4, and the individual light emitting elements LED are set to emit the same amount of light, a horizontal position of the detection object can be estimated from Equation (1). A1, A2, A3, and A4 represent respective detection levels when the light emitting elements LED1, LED2, LED3, and LED4 emit light.

[Equation 1]

$$G = \frac{(x1*A1 + x2*A2 + x3*A3 + x4*A4)}{(A1+A2+A3+A4)} \quad (1)$$

Here, when x1=1, x2=2, x3=3, and x4=4 with x1 to x4 being arranged at substantially equal intervals, Equation (1) is expressed as Equation (2).

[Equation 2]

$$G = \frac{(1*A1 + 2*A2 + 3*A3 + 4*A4)}{(A1+A2+A3+A4)} \quad (2)$$

From Equation (2), the estimated position G can be obtained in a range of 1<G<4. If the detection levels are observed as A1=2000, A2=700, A3=100, and A4=10 when the operation target 4 approaches the position P1, the estimated position G is calculated as 1.3 from Equation (2). In addition, if the detection levels are observed as A1=10, A2=100, A3=700, and A4=2000 when the operation target 4 approaches the position P2, the estimated position G is calculated as 3.7.

By estimating the horizontal position of the operation target as described above, for example, in a case where the horizontal position changes by a predetermined value or more within a designated time period (for example, one second), it can be determined that a swipe operation has been performed, and this determination can be applied to a gesture operation.

FIG. 5 is a schematic cross-sectional view illustrating an internal structure of a proximity detection unit 3 provided at the lower portion of the display 1. The proximity detection unit 3 includes a substrate 10 on which optical elements such as the light emitting elements LED and the light receiving elements PD are mounted, a plurality of holders (support members) 20 attached on the substrate 10, and a cover 30 supported by the plurality of holders 20.

The holders 20 are partition members, mechanically support the cover 30, and form a plurality of internal spaces between the substrate 10 and the cover 30, and the light emitting elements LED and the light receiving elements PD are arranged in the internal spaces. For example, the holder 20 may be made of a light shielding material or may have a front surface to which an antireflective film, a light absorbing film, or the like may be attached. The holder 20 blocks the light so that the light emitted by the light emitting elements LED does not directly irradiate an adjacent light receiving element PD.

The cover 30 includes an optical member that does not transmit visible light but transmits only infrared rays in order to prevent an internal optical element from being seen by an external user. For example, the cover 30 may be made of a material containing a material capable of transmitting infrared light such as polycarbonate, or may have a front surface made of glass or the like to which a reflective film that reflects visible light may be attached.

However, it is difficult to realize the cover 30 that transmits almost 100% of infrared light while blocking most visible light, and it is realistic that transmittance of infrared light is at most about 80%. In this case, as illustrated in FIG. 6, an event occurs in which some infrared light Q1 that is not transmitted through the cover 30, of infrared light Q emitted by the light emitting element LED, reaches the light receiving element PD through an inside or the like of the cover 30 (hereinafter, this infrared light is referred to as light leakage).

When light leakage occurs, the light receiving element PD receives infrared light even though there is no detection target (operation target 4). When the amount of light leakage increases, an original principle of detecting a nearby object based on the amount of light received by the light receiving element PD cannot continue. This results in an obstacle to operation of a proximity detection system.

Incidentally, in order to stabilize estimation accuracy of the horizontal position, it is desirable to set an equal distance between the light emitting elements LED and the light receiving elements PD used in individual measurements, as described above. However, in reality, this may not be satisfied due to restrictions on product design. For example, in a case where the cover 30 is designed to have unevenness or marks thereon, optical elements need to be arranged to avoid the unevenness or marks, and as a result, distances between the light emitting elements LED and the light receiving elements PD may not be equal.

FIG. 7 illustrates an arrangement example in which the distances between the light emitting elements LED and the light receiving elements PD cannot be equal due to design restrictions. In a case where a protrusion or a mark is arranged at a position A on the front surface of the cover 30, the light receiving element PD1 is moved to a right direction so that an optical path of the infrared light is not hindered, and the light receiving element PD1 approaches the light emitting element LED2. As a result, a distance D between the light emitting element LED2 and the light receiving element PD1 becomes smaller than that of combinations of other light emitting elements and light receiving elements. If the distance between the light emitting element LED and the light receiving element PD is short, the light leakage increases because a light leakage path is short even if the light emitting element LED emits the same amount of light, and a defect of a detection function is likely to occur in measurements performed by the light emitting element LED and the light receiving element PD which are arranged at a short distance. In the case of the arrangement example illustrated in FIG. 7, the distance D between the light emitting element LED2 and the light receiving element PD1 is, for example, 30 to 35 mm, and the distances between the other light emitting elements and the light receiving elements are, for example, 35 to 40 mm, and thus malfunction of a proximity detection function is likely to occur in measurements performed by a combination of the light emitting element LED2 and the light receiving element PD1.

Objects of the present disclosure are to solve the conventional problems and to provide a proximity detection device and a method for detecting proximity capable of avoiding detection failure due to light leakage from a light emitting element.

A proximity detection device according to the present disclosure is a device that detects proximity of an object by irradiating the object with light from light emitting elements and receiving reflected light by light receiving elements, the proximity detection device including: a plurality of the light emitting elements; a plurality of light receiving elements; a drive unit configured to sequentially drive the plurality of light emitting elements; a measurement unit configured to measure a detection signal output from a corresponding light receiving element when the plurality of light emitting elements are sequentially driven; and, a control unit configured to i) control a drive current of a light emitting element such that a light emission amount of the light emitting element is suppressed, and ii) amplify a detection signal of a light receiving element to compensate for the suppressed light emission amount during measurement with a relatively short distance between the light emitting element and the light receiving element.

In one aspect, the plurality of light emitting elements and the plurality of light receiving elements are arranged substantially linearly, a first light emitting element is arranged on one side of the light receiving elements, a second light emitting element is arranged on the other side, and a distance between the first light emitting element and a corresponding light receiving element is smaller than a distance between the second light emitting element and a corresponding light receiving element. In one aspect, the control unit i) suppresses a light emission amount of the first light emitting element and ii) amplifies a detection signal of a light receiving element corresponding to driving of the first light emitting element. In one aspect, the measurement unit measures detection signals output from a light receiving element common to the first light emitting element and the second light emitting element. In one aspect, the light emitting elements emit infrared light, the light receiving elements receive the infrared light, and an optical member that transmits the infrared light but blocks visible light from the outside is arranged above the plurality of light emitting elements and the plurality of light receiving elements. In one aspect, the plurality of light emitting elements and the plurality of light receiving elements are mounted on a substrate, a plurality of internal spaces are formed between the substrate and the optical member by a partition member having a light shielding property, and one light receiving element is arranged in one internal space. In one aspect, the control unit includes an amplifier that amplifies the detection signal. In one aspect, the control unit amplifies the detection signal by software processing.

A method for detecting proximity according to the present disclosure is a method for detecting proximity of an object by irradiating the object with light from light emitting elements and receiving reflected light by light receiving elements, the method including: a step of sequentially driving a plurality of the light emitting elements; a step of measuring a detection signal output from a corresponding light receiving element when the plurality of light emitting elements are sequentially driven; a step of reducing a drive current of a corresponding light emitting element such that a light emission amount of the light emitting element is suppressed during measurement with a relatively short distance between the light emitting element and the light receiving element; and, a step of amplifying the detection signal of the light receiving element to compensate for the suppressed light emission amount. In one aspect, the step of amplifying the detection signal is processed by software.

According to the present disclosure, during measurement with a relatively short distance between the light emitting element and the light receiving element, the drive current of the light emitting element is controlled so that the light emission amount of the light emitting element is suppressed, and the detection signal of the light receiving element is amplified to compensate for the suppressed light emission amount. Hence, while light leakage from the light emitting element is suppressed, sensitivity in individual measurements can be made uniform, and highly reliable proximity detection can be provided.

BRIEF DESCRIPTION OF THE DRAWINGS

FIG. 1A illustrates an arrangement example of a display on which the proximity detection device is mounted; and, FIG. 1B is a diagram illustrating an example in which an operation target is detected by the proximity detection device;

DETAILED DESCRIPTION

Next, embodiments of the present disclosure will be described. In one aspect, a proximity detection device according to the present disclosure includes a light emitting element and a light receiving element receiving light reflected by an object irradiated with light from the light emitting element, and optically detects whether or not there is an object that is in proximity thereto. For example, the light emitting element is a light emitting diode, a laser diode, or the like which emits infrared light, and the light receiving element is a photodiode, a phototransistor, or the like which receives infrared light. One or more light emitting elements and one or more light receiving elements are integrally installed on the periphery of an electronic device or the like to detect an operation target of a user that is in proximity to the electronic device. The electronic device in which the proximity detection device is installed is not particularly limited, but the electronic device may be, for example, a touch panel display. When the proximity of the operation target of the user is detected, the electronic device detects a gesture operation, such as a swipe, for example.

EXAMPLES

Figure 8A:
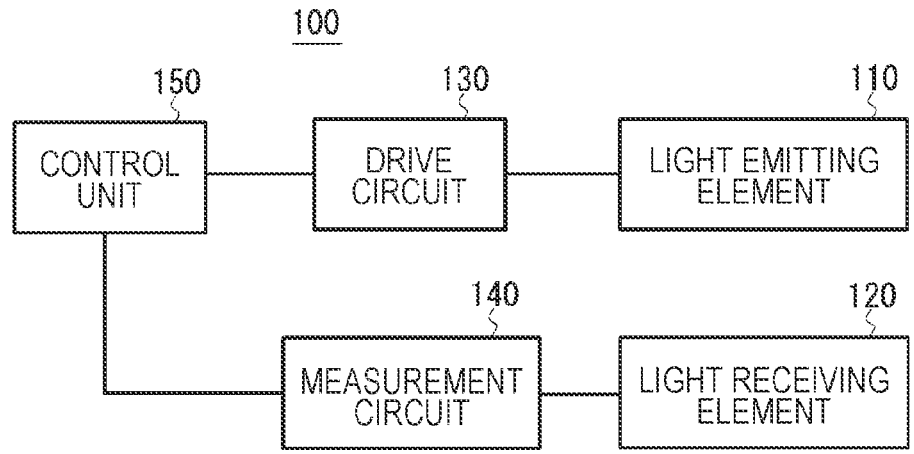
FIG. 8A is a block diagram illustrating a configuration of a proximity detection device according to a first example of the present disclosure; and, FIG. 8B is a diagram illustrating a specific configuration of the proximity detection device according to the first embodiment.

Next, a proximity detection device according to a first example of the present disclosure will be described. FIG. 8A is a block diagram illustrating an electrical configuration of the proximity detection device according to the embodiment of the present disclosure. The proximity detection device 100 according to the present example includes a plurality of light emitting elements 110, a plurality of light receiving elements 120, a drive circuit 130 configured to drive the plurality of individual light emitting elements 110, a measurement circuit 140 configured to measure light received by the plurality of individual light receiving elements 120, and a control unit 150 configured to entirely control the proximity detection device 100.

Figure 1A:
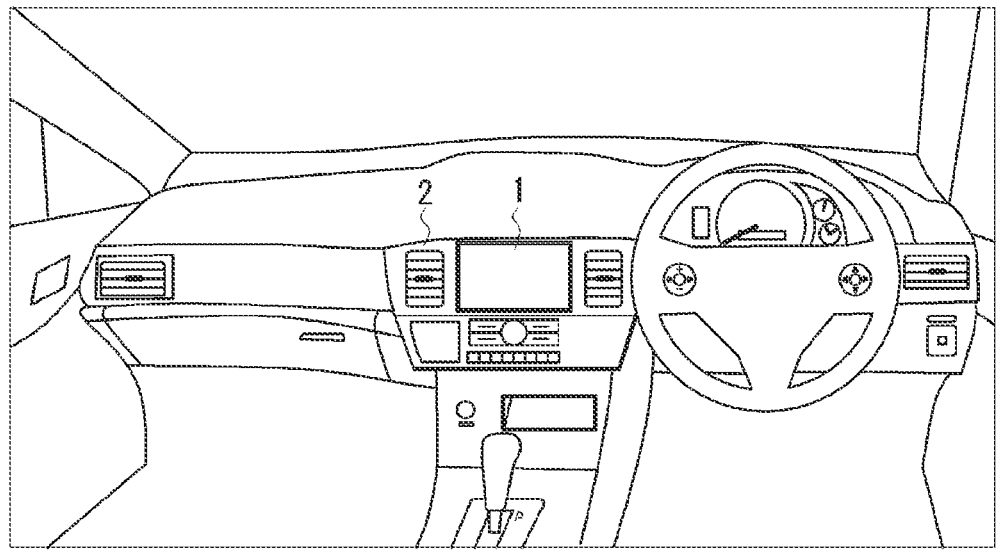
FIGS. 1A and 1B illustrate an example of a proximity detection device in the related art.
Figure 1B:
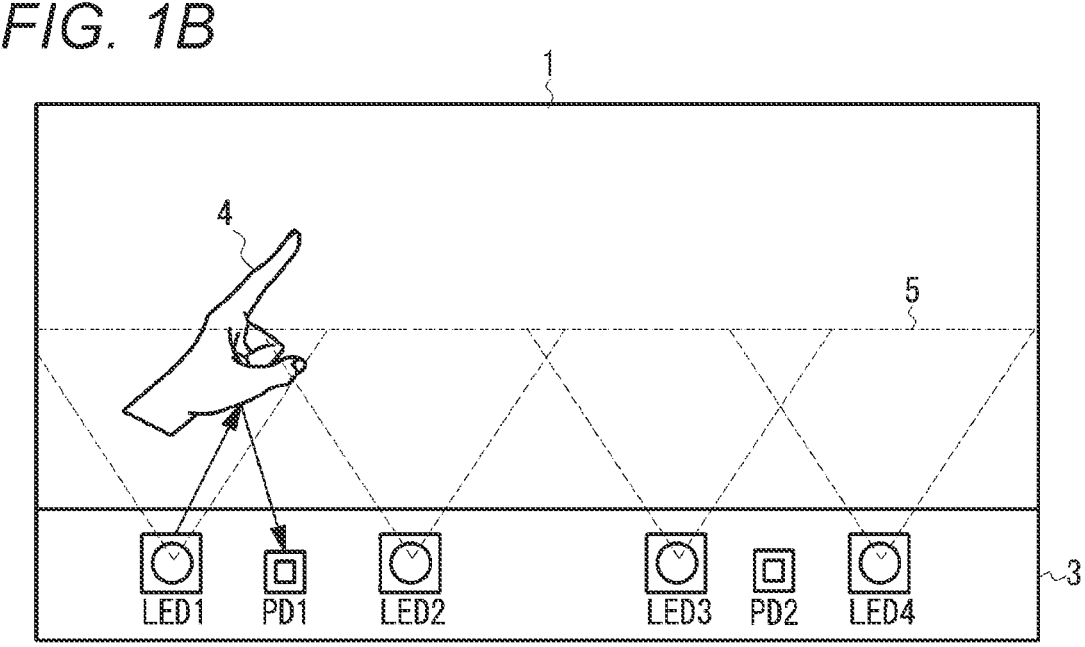
Figure 2:
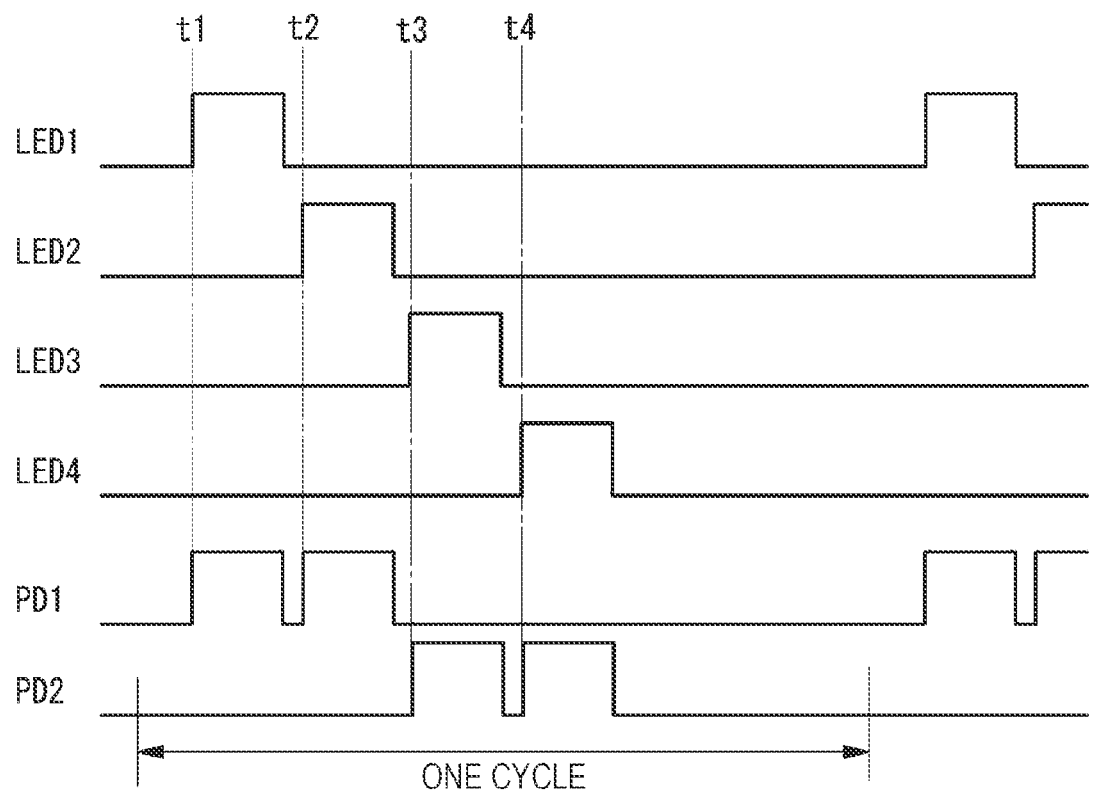
FIG. 2 is a diagram illustrating operation timings of light emitting elements and light receiving elements of the proximity detection device in the related art.
Figure 3:
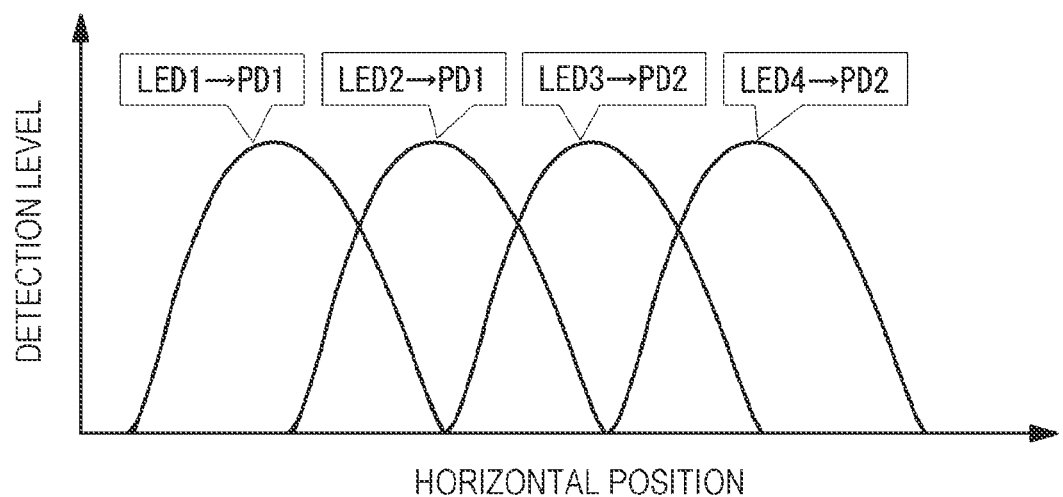
FIG. 3 is a diagram illustrating detection levels of the light receiving elements when the operation target moves horizontally.
Figure 4A:
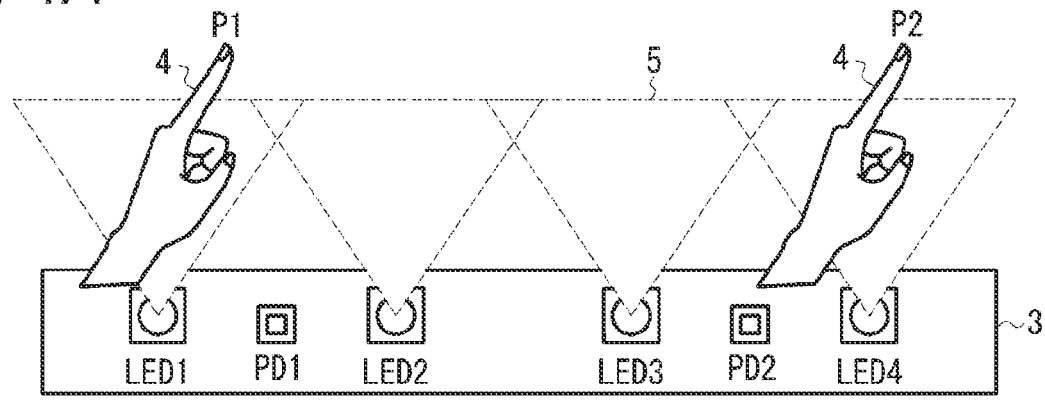
FIGS. 4A to 4D are diagrams illustrating detection levels of the light receiving elements in one cycle when the operation target approaches position, and estimated positions calculated from a distribution of the detection levels.
Figure 4B:
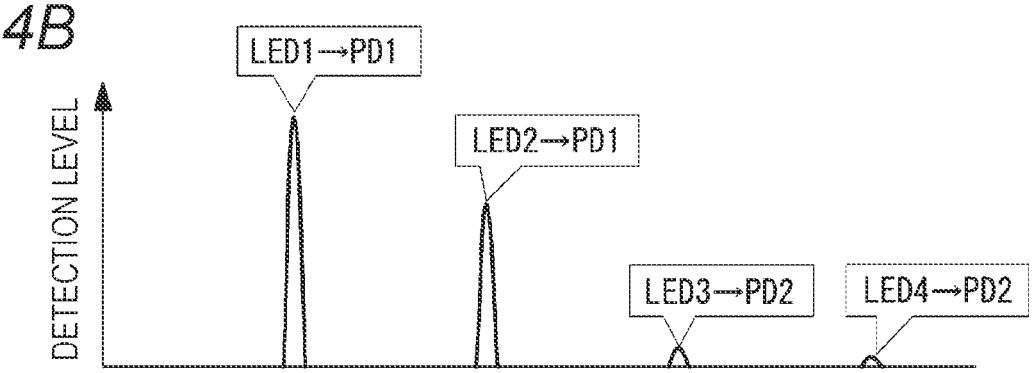
Figure 4C:
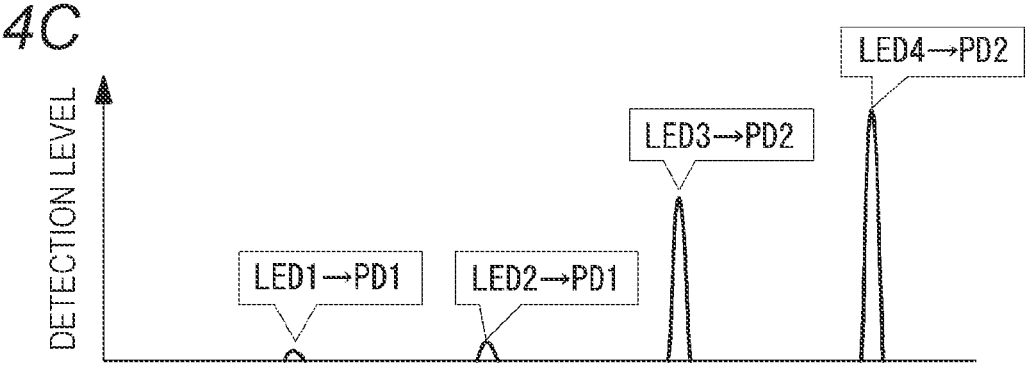
Figure 4D:
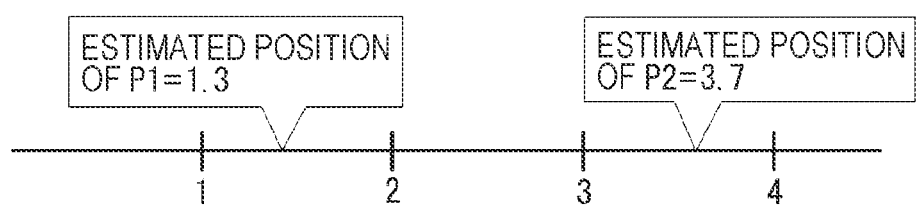

The proximity detection device 100 is mounted, for example, on an in-vehicle display 1, as illustrated in FIG. 1B, to detect whether or not there is an operation target of a user that is in proximity to the display 1. As illustrated by a proximity detection unit in FIG. 7, the light emitting elements 110 include light emitting elements LED1 to LED4, and the light receiving elements 120 include a light receiving element PD1 arranged between the light emitting elements LED1 and LED2 and a light receiving element PD2 arranged between the light emitting elements LED3 and LED4. As illustrated in FIG. 2, the drive circuit 130 sequentially drives the light emitting elements LED1 to LED4 during a cycle period so that light emissions of the light emitting elements LED1 to LED4 do not overlap, and the measurement circuit 140 measures, during the cycle period, a detection signal received by the light receiving element PD1 when the light emitting element LED1 is caused to emit light (LED1→PD1), measures a detection signal received by the light receiving element PD1 when the light emitting element LED2 is caused to emit light (LED2→PD1), measures a detection signal received by the light receiving element PD2 when the light emitting element LED3 is caused to emit light (LED3→PD2), and measures a detection signal received by the light receiving element PD2 when the light emitting element LED4 is caused to emit light (LED4→PD2).

The control unit 150 controls driving of the light emitting elements 110 by the drive circuit 130, and controls measurement of the light receiving elements 120 by the measurement circuit 140. Further, the control unit 150 determines whether or not there is an operation target that is in proximity to the display 1 on the basis of measurement results of the measurement circuit 140, estimates a horizontal position of the operation target on the basis of a distribution of the detection levels of the light receiving elements PD1 and PD2 measured in the cycle, and determines a gesture operation such as a swipe from the estimation result.

The control unit 150 may be a part of a display controller controlling a display on the display 1, or may be provided separately from the display controller and operate in cooperation with the display controller. For example, when a swipe operation is detected by the control unit 150, the display controller can control a display (for example, a display of a menu screen, a display of a next page screen, or the like) according to a detection result. The control unit 150 is implemented using hardware and/or software. The control unit 150 includes, for example, a microcontroller including a ROM/RAM, a microprocessor, a memory, and the like, and executes a program stored in the ROM or the memory, thereby controlling individual configurational elements.

Figure 5:
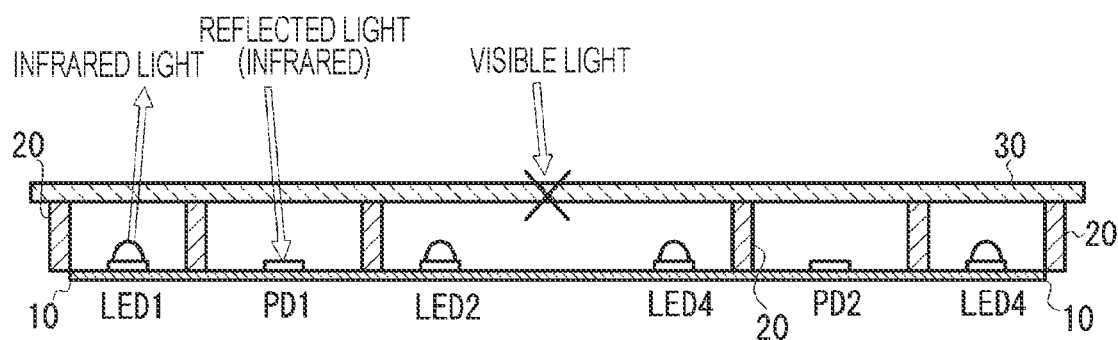
FIG. 5 is a schematic cross-sectional view illustrating an internal configuration of a proximity detection unit.
Figure 6:
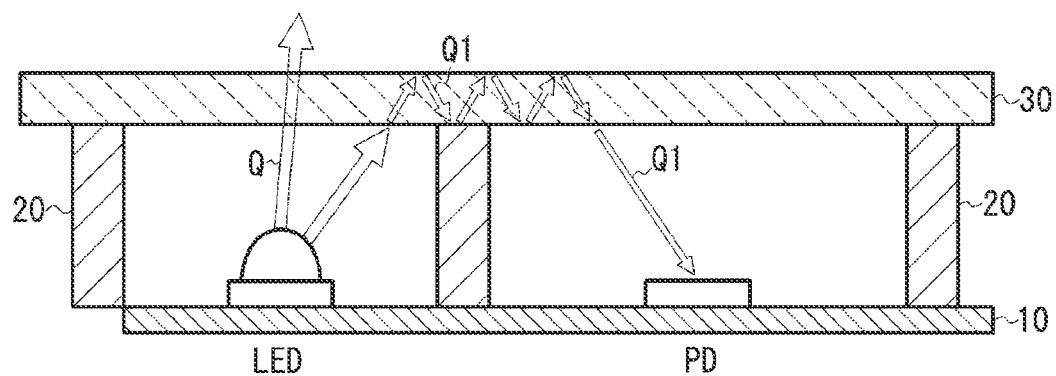
FIG. 6 is a view for explaining light leakage of the proximity detection unit illustrated in FIG. 5.
Figure 7:
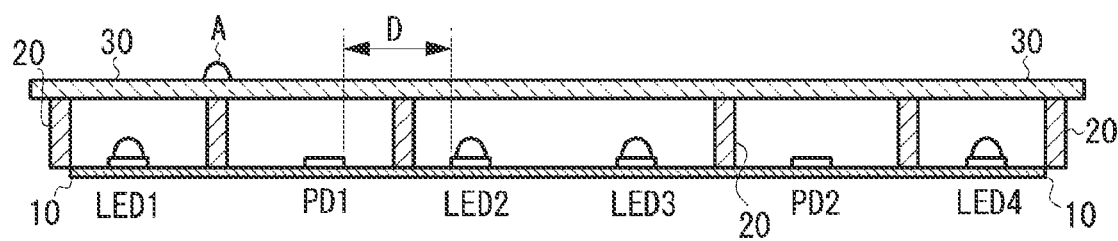
FIG. 7 is a view illustrating an example in which distances between the light emitting elements and the light receiving elements cannot be uniform in the proximity detection unit.
Figure 8B:
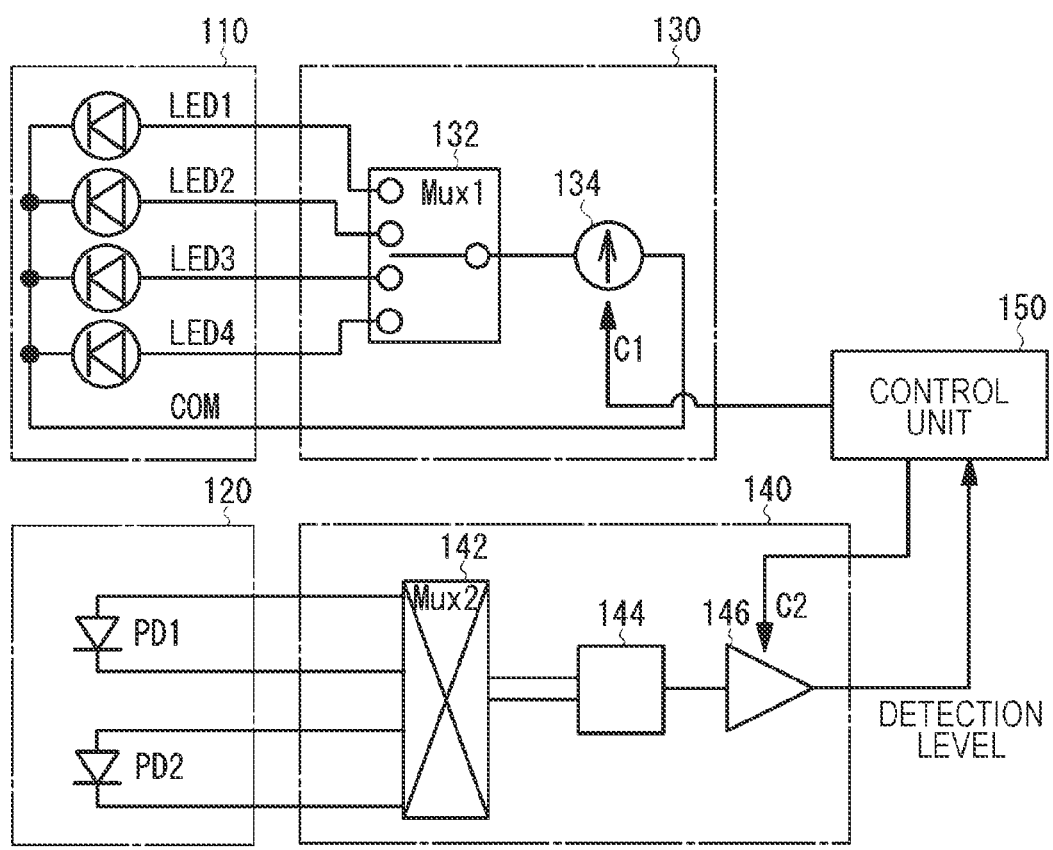

FIG. 8B is a diagram illustrating a specific configuration example of the proximity detection device according to the first example of the present disclosure. The light emitting elements 110 and the light receiving elements 120 include the light emitting elements LED1, LED2, LED3, and LED4 and the light receiving elements PD1 and PD2 arranged in the proximity detection unit, as illustrated in FIGS. 5 and 7.

The drive circuit 130 includes a multiplexer (Mux 1) 132 for sequentially driving the light emitting elements LED1, LED2, LED3, and LED4 at timings illustrated in FIG. 2, and a current source 134 for supplying a drive current to a light emitting element LED selected by the multiplexer 132. As will be described below, in response to a control signal C1 from the control unit 150, the current source 134 reduces the drive current to the light emitting element LED that may cause light leakage.

The measurement circuit 140 includes a multiplexer (Mux 2) 142 for selecting the light receiving elements PD1 and PD2 corresponding to the light emission of the light emitting elements LED sequentially driven at the timings illustrated in FIG. 2, a measuring instrument 144 for measuring a detection signal photoelectrically converted by the selected light receiving element PD, and an amplifier 146 for amplifying the detection signal measured by the light receiving element PD corresponding to the light emitting element having a light emission amount suppressed in response to a control signal C2 from the control unit 150. The control unit 150 calculates a detection level based on the detection signal output from amplifier 146 and estimates a horizontal position of the operation target by Equation (1).

When a distance between the light emitting element LED and the light receiving element PD becomes short, as described above, the light leakage path becomes short, so that the light leakage increases, and a defect of a detection function is likely to occur. In this respect, in the present example, in response to the control signal C1 from the control unit 150, the drive circuit 130 controls a drive current to the light emitting element LED to suppress the light emission amount of the light emitting element LED more than that in measurements of a combination of other light emitting elements and light receiving elements, in the measurements with a short distance between the light emitting element LED and the light receiving element PD. For example, in an arrangement example illustrated in FIG. 7, the drive current of the light emitting element LED2 in measurements between the light emitting element LED2 and the light receiving element PD1 is made lower than the drive current in measurements of the other combinations of the other light emitting elements and the light receiving elements, and the light emission amount of the light emitting element LED2 is suppressed. When the light emission amount of the light emitting element LED2 decreases, the amount of light leakage sensed by the light receiving element PD1 can be suppressed in proportion to the decrease in light emission amount thereof, and the influence of light leakage can be suppressed.

Figure 9:
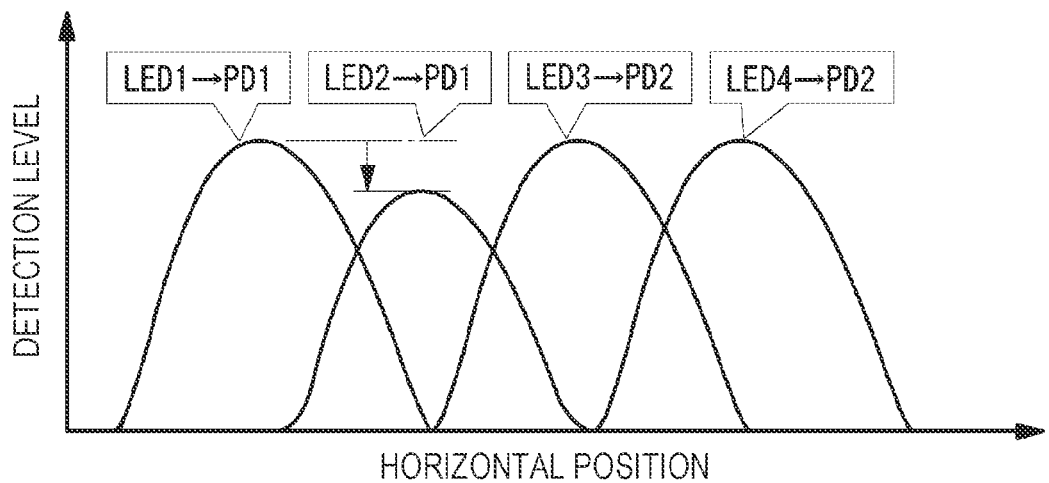
FIG. 9 is a diagram illustrating detection levels of the light receiving elements when the operation target moves horizontally in the first example of the present disclosure.

FIG. 9 illustrates detection levels of the light receiving elements when the operation target moves horizontally in a case where the light emission amount of the light emitting element LED2 is suppressed. As illustrated in the drawing, when the light emission amount of the light emitting element LED2 is suppressed, the detection level between the light emitting element LED2 and the light receiving element PD1 is lower than the detection levels in measurements of the other combinations of the other light emitting elements and the other light receiving elements. That is, the measurement between the light emitting element LED2 and the light receiving element PD1 means that the sensitivity decreases. As a result, there is a concern that an error may occur in position estimation in the horizontal direction by Equation (1), or a detection range of a position to be detected in measurements between the light emitting element LED2 and the light receiving element PD1 may be narrowed. Hence, in the present example, in response to the control signal C2 from the control unit 150, the measurement circuit 140 causes the amplifier 146 in the subsequent stage to further amplify the detection signal of the light receiving element corresponding to the light emitting element in which the light emission amount measured by the measuring instrument 144 is suppressed. In the example of FIG. 7, in the measurement of the light emitting element LED2 and the light receiving element PD1, the detection signal of the light receiving element PD1 measured by the measuring instrument 144 is amplified by the amplifier 146. Preferably, the amplifier 146 amplifies the detection signal to compensate for the suppressed amount of light emission of the light emitting element LED2.

Next, an operation of the proximity detection device 100 when it is assumed that the proximity detection unit has the arrangement example illustrated in FIG. 7 will be described. The drive circuit 130 causes the multiplexer (Mux 1) 132 to switch between the light emitting elements LED1, LED2, LED3, and LED4 to light up in order for each time of measurement. At the same time, the current source 134 controls the drive current to the light emitting element LED so that the detection levels of individual measurements are substantially the same. However, in response to the control signal C1, the current source 134 decreases a magnitude of the drive current only when the light emitting element LED2 lights up. How much the drive current of the light emitting element LED2 is decreased is determined in advance according to a distance between the light emitting element LED2 and the light receiving element PD1. In addition, measurement performed with a relatively short distance between the light emitting element and the light receiving element is set in the control unit 150 in advance.

The multiplexer 142 of the measurement circuit 140 selects the light receiving element PD1 when the light emitting elements LED1 and LED2 light up and selects the light receiving element PD2 when the light emitting elements LED3 and LED4 light up, and the measuring instrument 144 measures the detection signal photoelectrically converted by the selected light receiving element PD. The amplifier 146 provided at the subsequent stage of the measuring instrument 144 does not amplify the detection signal of the light receiving element PD in measurements of the light emitting elements LED1, LED3, and LED4, and amplifies the detection signal to compensate for the suppressed drive current of the light emitting element LED2 in response to the control signal C2 only in measurements in the combination of the light emitting element LED2 and the light receiving element PD1. For example, when a current value of the drive current of the light emitting element LED is suppressed by 20%, the current value of the detection signal measured by the light receiving element is amplified by 20%.

In this manner, while light leakage occurring in measurements between the light emitting element LED2 and the light receiving element PD1 which are at a short distance is suppressed, sensitivities in individual measurements can be made uniform at the detection level that is finally output, so that a stable detection range and positional accuracy can be realized.

In the description provided above, the example in which the distance between the light emitting element LED2 and the light receiving element PD1 is short has been described; however, this is an example, and when a distance is short in a combination of another light emitting element and another light receiving element, a light emission amount of the light emitting element is similarly suppressed and a detection signal of the light receiving element is amplified. In the description provided above, an example in which a distance between one set of the light emitting element and the light receiving element is short has been described; however, the present disclosure is not limited thereto. In a case where distances between a plurality of sets of the light emitting elements and the light receiving elements are short, the light emission amounts of the light emitting elements are suppressed and detection currents of the light receiving elements are amplified in the plurality of sets.

Next, a second example of the present disclosure will be described. In the first example, the detection signal of the light receiving element is electrically amplified by the amplifier 146, but in the second example, this amplification process is realized by software processing.

Figure 10:
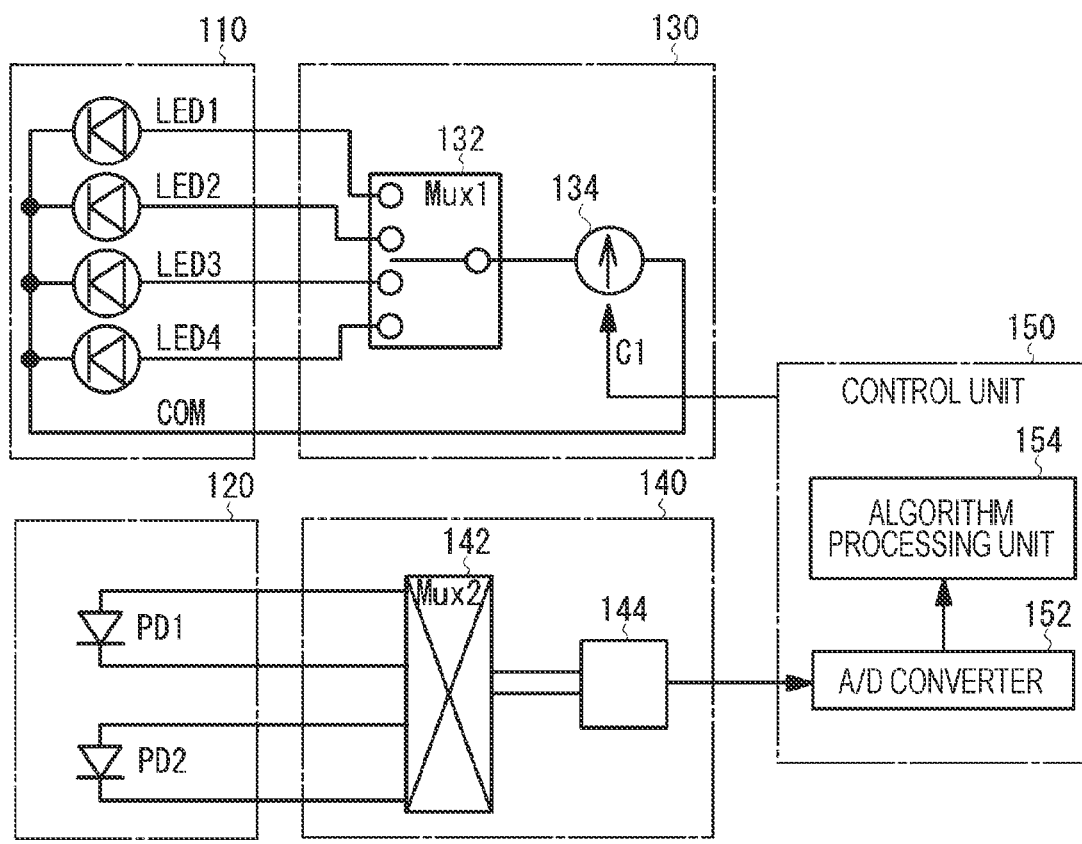
FIG. 10 is a diagram illustrating a configuration of a proximity detection device according to a second example of the present disclosure.

FIG. 10 illustrates a configuration example of the proximity detection device according to the second example. The second example has the same configuration as the first example, but does not include the amplifier 146 used in the first example. Instead, the detection signal measured by the measuring instrument 144 is supplied to an A/D conversion unit 152 of the control unit 150, converted into a digital signal by the A/D conversion unit, and then amplified by an algorithm processing unit 154.

Moreover, the algorithm processing unit 154 can execute a process of estimating a position of the operation target in the horizontal direction by Equation (1) on the basis of the detection level obtained by individual measurements, in addition to amplification of the detection signal. Further, the algorithm processing unit 154 can process the control signal C1 for controlling the current source 134 of the drive circuit 130 by software. The algorithm processing unit 154 includes, for example, a ROM/RAM that stores the software, a CPU that executes software, or a microcontroller.

Figure 11:
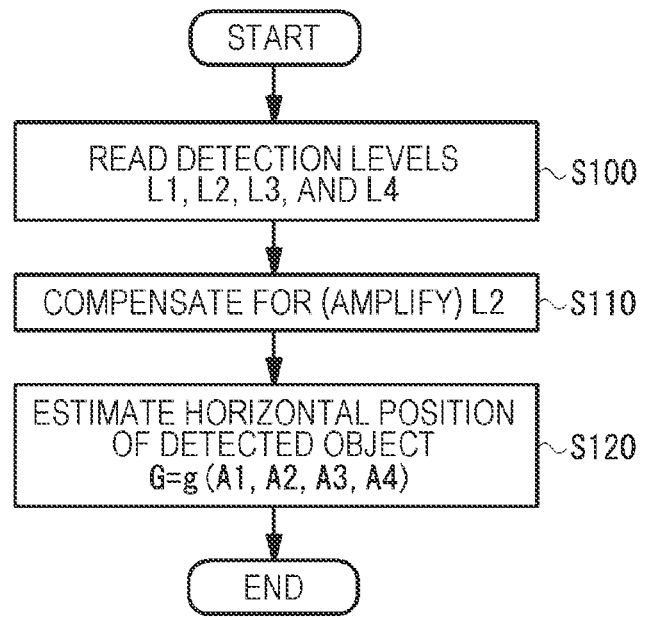
FIG. 11 is a flowchart illustrating an operation flow of the proximity detection device according to the second example of the present disclosure.

FIG. 11 illustrates an operation flow of the algorithm processing unit 154. The detection levels L1, L2, L3, and L4 in individual measurements are converted into digital values by the A/D conversion unit 152 and provided to the algorithm processing unit 154 (S100). The algorithm processing unit 154 amplifies the detection level L2 by multiplying a constant and only the detection level L2 of the light receiving element PD1 obtained in measurements between the light emitting element LED2 and the light receiving element PD1 to compensate for the suppressed light emission amount of the light emitting element LED2 (S110), and then performs a process of estimating a position G in the horizontal direction of the operation target according to Equation (1) based on the detection levels L1, L2, L3, and L4 (S120).

Also in the second example, similarly to the first example, sensitivities in individual measurement can be made uniform at the detection level that is finally output while the light leakage occurring in measurement between the light emitting element LED2 and the light receiving element PD1 which are at a relatively short distance is suppressed, so that the stable detection range and the positional accuracy can be realized. In addition, in the second example, as compared with a proximity detection device in the related art, it is only necessary to change the control of the drive current of the light emitting element LED and the calculation of the software processing, and since there is no increase in hardware, the above-described effect can be realized without an increase in costs.

Figure 12:
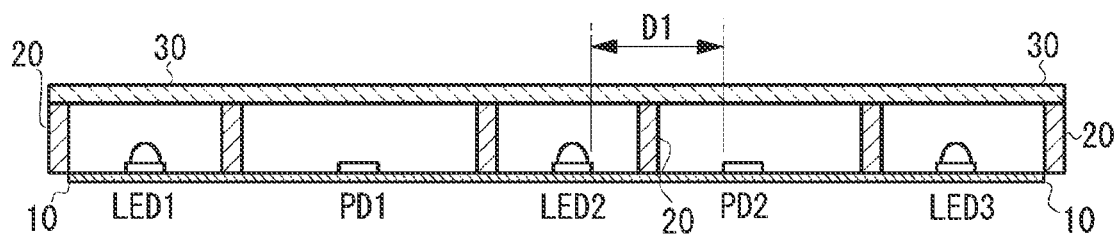
FIG. 12 is a schematic cross-sectional view illustrating an internal configuration of a proximity detection unit according to a third example of the present disclosure.

Next, a third example of the present disclosure will be described. FIG. 12 is a schematic cross-sectional view illustrating an internal structure of a proximity detection unit according to the third example. The proximity detection unit of the present example has an arrangement example different from the arrangement example illustrated in FIG. 7, in that the proximity detection unit arranges three light emitting elements LED1, LED2, and LED3 and two light receiving elements PD1 and PD2 therebetween. In a display having a small horizontal size, the proximity detection unit may be configured to include three light emitting elements LED and two light receiving elements PD.

Figure 13:
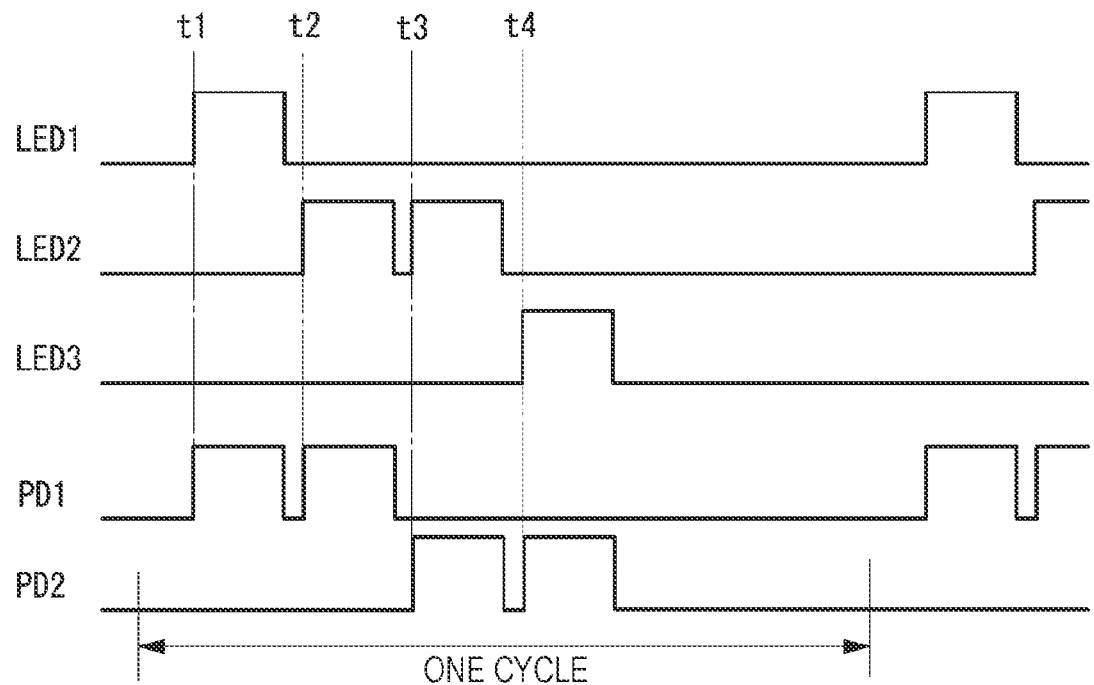
FIG. 13 is a diagram illustrating operation timings of light emitting elements and light receiving elements of a proximity detection device according to a third example of the present disclosure.

FIG. 13 is a diagram illustrating operation timings of the light emitting elements and the light receiving elements of a proximity detection device according to the third example. In the third example, a detection signal received by the light receiving element PD1 when the light emitting element LED1 is caused to emit light at a time point t1 is measured (LED1→PD1), a detection signal received by the light receiving element PD1 when the light emitting element LED2 is caused to emit light at a time point t2 is measured (LED2→PD1), a detection signal received by the light receiving element PD2 when the light emitting element LED2 is caused to emit light at a time point t3 is measured (LED2→PD2), and a detection signal received by the light receiving element PD2 when the light emitting element LED3 is caused to emit light at a time point t4 is measured (LED3→PD2). That is, the light emission of the light emitting element LED2 is measured by both the light receiving element PD1 and the light receiving element PD2.

Figure 14:
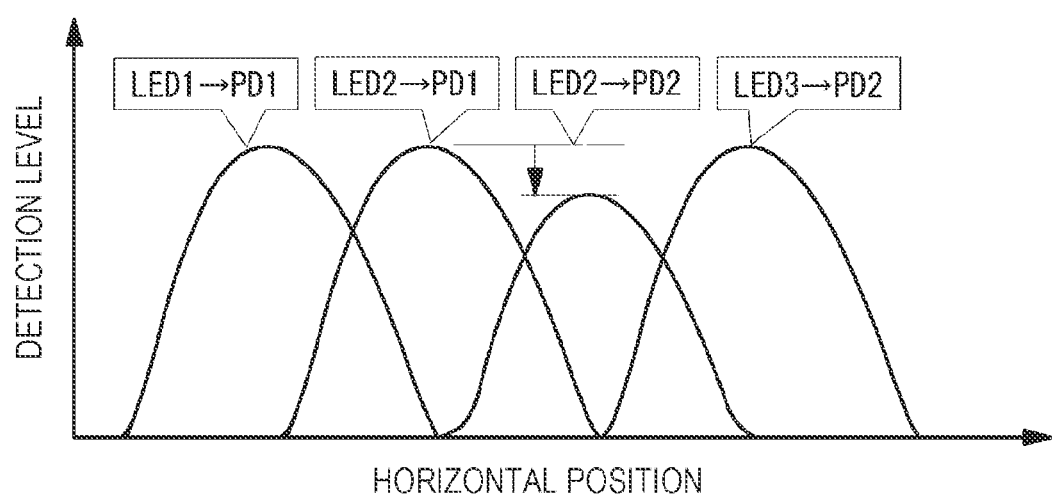
FIG. 14 is a diagram illustrating detection levels of the light receiving elements when an operation target moves horizontally in the third example of the present disclosure; and, FIG. 15 is a diagram illustrating a configuration of the proximity detection device according to the third example of the present disclosure.

As illustrated in FIG. 12, when a distance D1 between the light emitting element LED2 and the light receiving element PD2 is shorter than distances of combinations of other light emitting elements and other light receiving elements, a light emission amount of the light emitting element LED2 is not suppressed in measurements between the light emitting element LED2 and the light receiving element PD1, but a light emission amount (drive current) of the light emitting element LED2 is suppressed in measurements between the light emitting element LED2 and the light receiving element PD2, and light leakage from the light emitting element LED2 to the light receiving element PD2 is suppressed. In this case, as illustrated in FIG. 14, a detection level in measurements between the light emitting element LED2 and the light receiving element PD2 is lower than detection levels in other measurements.

Figure 15:
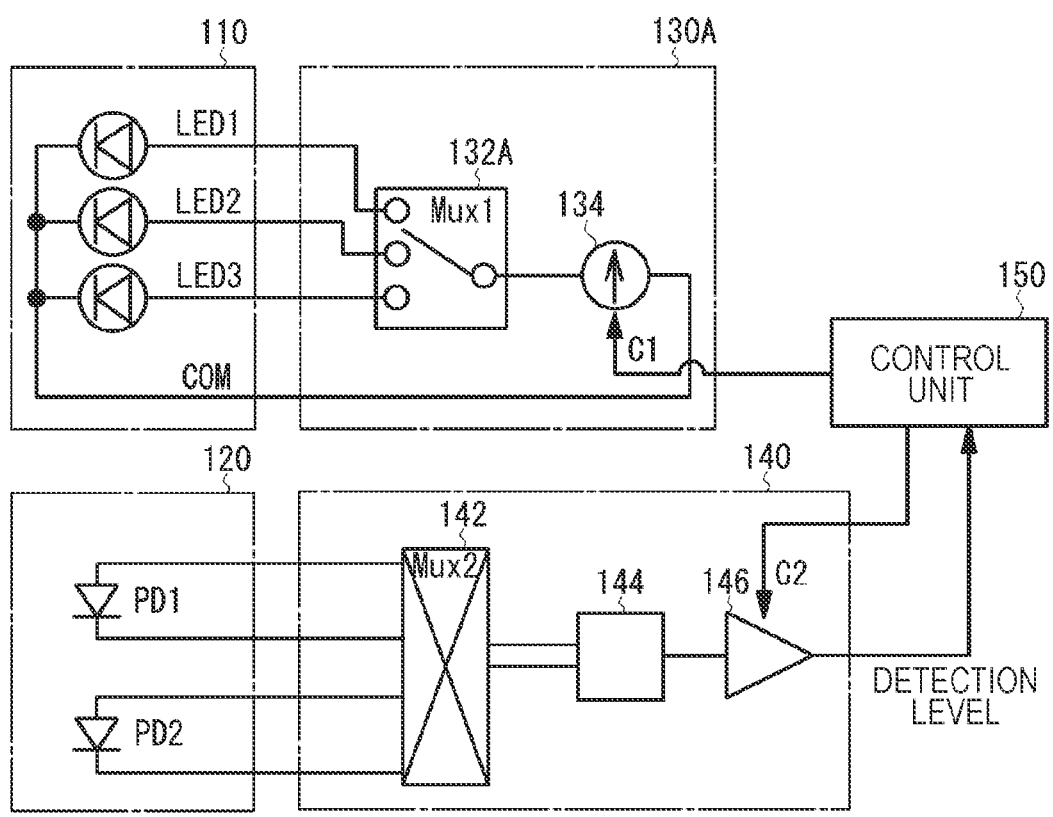

FIG. 15 is a diagram illustrating a configuration of the proximity detection device according to the third example, and the same configurations as those of the first example are denoted by the same reference numerals. A drive circuit 130A causes a multiplexer (Mux 1) 132A to switch between the light emitting elements LED1, LED2, and LED3 to light up in order for each time of measurement. At the same time, the current source 134 controls the drive current to the light emitting element LED so that the detection levels of individual measurements are substantially the same. However, in response to the control signal C1, the current source 134 decreases the drive current of the light emitting element LED2 only in measurement between the light emitting element LED2 and the light receiving element PD2 to suppress the light emission amount.

The multiplexer 142 of the measurement circuit 140 selects the light receiving element PD1 when the light emitting elements LED1 and LED2 light up and selects the light receiving element PD2 when the light emitting elements LED2 and LED3 light up, and the measuring instrument 144 measures the detection signal photoelectrically converted by the selected light receiving element PD. In response to the control signal C2, the amplifier 146 provided at the subsequent stage of the measuring instrument 144 amplifies the detection signal to compensate for the suppressed light emission amount of the light emitting element LED only in measurement between the light emitting element LED2 and the light receiving element PD2.

According to the present example, in measurement in a combination in which the distance between the light emitting element and the light receiving element is relatively small, the light leakage from the light emitting element which is received by the light receiving element is reduced by suppressing the light emission amount of the light emitting element, and the detection current of the light receiving element is amplified to compensate for the suppressed light emission amount. In this manner, a decrease in sensitivity in measurement in which the light emission amount is suppressed is prevented. Consequently, it is possible to provide a proximity detection device that prevents malfunction of the proximity detection system due to light leakage and maintains a stable detection range and accuracy of position estimation.

Specific embodiments and specific examples of the present disclosure have been described above with reference to the attached drawings. The specific embodiments and specific examples described above are only specific examples of the present disclosure, which are used to understand the present disclosure, rather than limit the scope of the present disclosure. Those skilled in the art can make various modifications, combinations and reasonable omissions of elements in specific embodiments and specific examples based on the technical ideas of the present disclosure, and the embodiments thus obtained are also included in the scope of the present disclosure. For example, the above-mentioned embodiments and specific examples may be combined with each other, and the combined embodiments are also included in the scope of the present disclosure. Therefore, it is intended that this disclosure not be limited to the particular embodiments disclosed, but that the invention will include all embodiments falling within the scope of the appended claims.

What is claimed is:

1. A proximity detection device that detects proximity of an object by irradiating the object with light from light emitting elements and receiving reflected light by light receiving elements, the proximity detection device comprising:
    a plurality of the light emitting elements;
    a plurality of the light receiving elements;
    a drive unit configured to sequentially drive the plurality of light emitting elements;
    a measurement unit configured to measure a detection signal output from a corresponding light receiving element when the plurality of light emitting elements are sequentially driven; and,
    a control unit configured to i) control a drive current of a light emitting element such that a light emission amount of the light emitting element is suppressed and, ii) amplify a detection signal of a light receiving element to compensate for the suppressed light emission amount during measurement with a relatively short distance between the light emitting element and the light receiving element;

wherein the plurality of light emitting elements and the plurality of light receiving elements are arranged substantially linearly, a first light emitting element is arranged on one side of the light receiving elements, a second light emitting element is arranged on the other side, and a distance between the first light emitting element and a corresponding light receiving element is smaller than a distance between the second light emitting element and a corresponding light receiving element; and, wherein the control unit suppresses a light emission amount of the first light emitting element and amplifies a detection signal of a light receiving element corresponding to driving of the first light emitting element.

2. The proximity detection device according to claim 1, wherein the measurement unit measures detection signals output from a light receiving element common to the first light emitting element and the second light emitting element.

3. The proximity detection device according to claim 1, wherein the light emitting elements emit infrared light, the light receiving elements receive the infrared light, and an optical member that transmits the infrared light, but blocks visible light from the outside, is arranged above the plurality of light emitting elements and the plurality of light receiving elements.

4. The proximity detection device according to claim 1, wherein the plurality of light emitting elements and the plurality of light receiving elements are mounted on a substrate, a plurality of internal spaces are formed between the substrate and the optical member by a partition member having a light shielding property, and one light receiving element is arranged in one internal space.

5. The proximity detection device according to claim 1, wherein the control unit includes an amplifier that amplifies the detection signal.

6. The proximity detection device according to claim 1, wherein the control unit amplifies the detection signal by software processing.

7. A proximity detection device that detects proximity of an object by irradiating the object with light from light emitting elements and receiving reflected light by light receiving elements, the proximity detection device comprising:
 a plurality of the light emitting elements;
 a plurality of the light receiving elements;
 a drive unit configured to sequentially drive the plurality of light emitting elements;
 a measurement unit configured to measure a detection signal output from a corresponding light receiving element when the plurality of light emitting elements are sequentially driven; and,
 a control unit configured to i) control a drive current of a light emitting element such that a light emission amount of the light emitting element is suppressed and, ii) amplify a detection signal of a light receiving element to compensate for the suppressed light emission amount during measurement with a relatively short distance between the light emitting element and the light receiving element;

wherein the plurality of light emitting elements and the plurality of light receiving elements are arranged substantially linearly, a first light emitting element is arranged on one side of the light receiving elements, a second light emitting element is arranged on the other side, and a distance between the first light emitting element and a corresponding light receiving element is smaller than a distance between the second light emitting element and a corresponding light receiving element; and, wherein the measurement unit measures detection signals output from a light receiving element common to the first light emitting element and the second light emitting element.

8. The proximity detection device according to claim 7, wherein the control unit suppresses a light emission amount of the first light emitting element and amplifies a detection signal of a light receiving element corresponding to driving of the first light emitting element.

9. The proximity detection device according to claim 7, wherein the light emitting elements emit infrared light, the light receiving elements receive the infrared light, and an optical member that transmits the infrared light, but blocks visible light from the outside, is arranged above the plurality of light emitting elements and the plurality of light receiving elements.

10. The proximity detection device according to claim 7, wherein the plurality of light emitting elements and the plurality of light receiving elements are mounted on a substrate, a plurality of internal spaces are formed between the substrate and the optical member by a partition member having a light shielding property, and one light receiving element is arranged in one internal space.

11. The proximity detection device according to claim 7, wherein the control unit includes an amplifier that amplifies the detection signal.

12. The proximity detection device according to claim 7, wherein the control unit amplifies the detection signal by software processing.

13. A proximity detection device that detects proximity of an object by irradiating the object with light from light emitting elements and receiving reflected light by light receiving elements, the proximity detection device comprising:
 a plurality of the light emitting elements;
 a plurality of the light receiving elements;
 a drive unit configured to sequentially drive the plurality of light emitting elements;
 a measurement unit configured to measure a detection signal output from a corresponding light receiving element when the plurality of light emitting elements are sequentially driven; and,
 a control unit configured to i) control a drive current of a light emitting element such that a light emission amount of the light emitting element is suppressed and, ii) amplify a detection signal of a light receiving element to compensate for the suppressed light emission amount during measurement with a relatively short distance between the light emitting element and the light receiving element;

wherein the plurality of light emitting elements and the plurality of light receiving elements are arranged substantially linearly, a first light emitting element is arranged on one side of the light receiving elements, a second light emitting element is arranged on the other side, and a distance between the first light emitting element and a corresponding light receiving element is smaller than a distance between the second light emitting element and a corresponding light receiving element; and, wherein the light emitting elements emit infrared light, the light receiving elements receive the infrared light, and an optical member that transmits the infrared light, but blocks visible light from the outside, is arranged above the plurality of light emitting elements and the plurality of light receiving elements.

14. The proximity detection device according to claim 13, wherein the control unit suppresses a light emission amount of the first light emitting element and amplifies a detection signal of a light receiving element corresponding to driving of the first light emitting element.

15. The proximity detection device according to claim 13, wherein the measurement unit measures detection signals output from a light receiving element common to the first light emitting element and the second light emitting element.

16. The proximity detection device according to claim 13, wherein the plurality of light emitting elements and the plurality of light receiving elements are mounted on a substrate, a plurality of internal spaces are formed between the substrate and the optical member by a partition member having a light shielding property, and one light receiving element is arranged in one internal space.

17. The proximity detection device according to claim 13, wherein the control unit includes an amplifier that amplifies the detection signal.

18. The proximity detection device according to claim 13, wherein the control unit amplifies the detection signal by software processing.

\* \* \* \* \*